United States Patent Office 3,671,099
Patented June 20, 1972

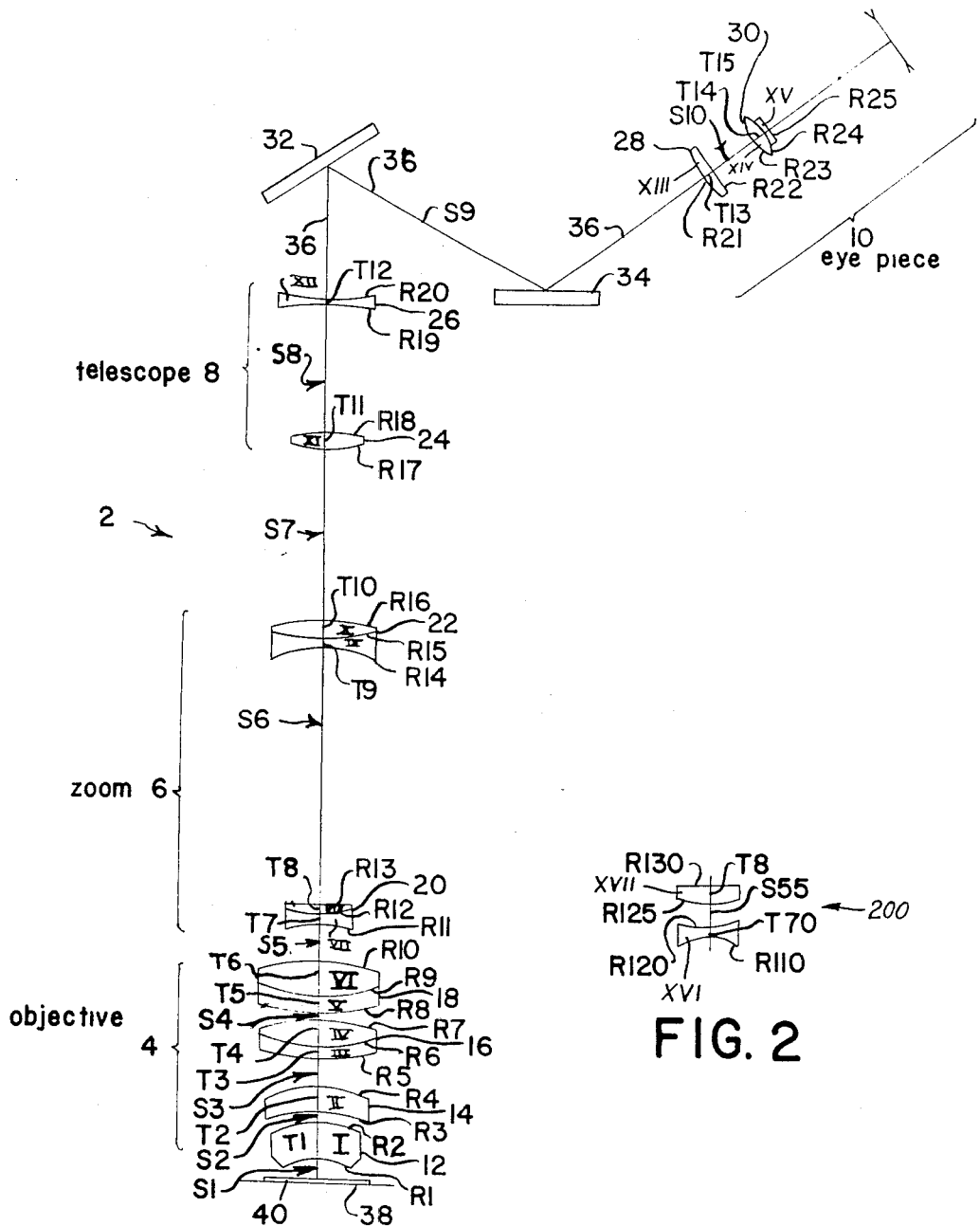

3,671,099
ZOOM OPTICAL SYSTEM FOR A MICROSCOPE
Arthur H. Shoemaker, East Aurora, and Milton H. Sussman, Buffalo, N.Y., assignors to American Optical Corporation, Southbridge, Mass.
Filed Apr. 1, 1971, Ser. No. 130,396
Int. Cl. G02b 7/04, 1/00, 15/04
U.S. Cl. 350—43
4 Claims

ABSTRACT OF THE DISCLOSURE

A ten component microscope system having a variable magnification of 90×–550× and a variable NA of respectively 0.16–0.55.

BACKGROUND OF THE INVENTION

This invention relates to optical systems for obtaining, from a given object, a well corrected image which remains substantially fixed while its size is progressively varied between two limits by suitable displacement of the optical elements. More particularly, this invention is related to a zoom microscope system providing an image which is well corrected for the usual chromatic aberrations, spherical aberration, coma, and astigmatism and which has a substantially flat image field throughout the zoom range of substantially 6.

DRAWING

FIG. 1 is an optical diagram of a zoom microscope system according to the present invention.

FIG. 2 is an optical diagram of two lens elements which may be substituted for the adjacent elements in FIG. 1, in an alternative embodiment.

DESCRIPTION

Referring now to FIG. 1, a microscope optical system is shown generally at 2. It includes an objective 4, a zoom system 6, a telescope 8, and an eyepiece 10.

Objective 4 includes the following components in optical alignment: a front single lens 12, a single lens 14, a doublet 16, and a doublet 18.

Zoom system 6 includes the following components in optical alignment: A doublet 20, and a doublet 22.

Telescope 8 includes the following components in optical alignment: A single lens 24 and a single lens 26.

Eyepiece 10 includes the following components in optical alignment: A single lens 28, and a doublet 30.

Between telescope 8 and eyepiece 10, mirrors 32 and 34 are suitably mounted to effect the folding of optical axis 36. The entire system is shown disposed along optical axis 36 relative to an object plane 38 supporting a specimen coverglass 40.

In objective 4, lens 12 is a concave-convex lens, also designated I. Lens 14 is a concave-convex lens, also designated II. Doublet 16 includes a convex-concave lens element III and a double convex lens element IV, together forming a double convex doublet. Doublet 18 includes a convex-concave lens element V and a double convex lens element VI, together forming a double convex doublet.

In zoom system 6, doublet 20 includes a double concave lens element VII and a convex-concave lens element VIII, together forming a double concave doublet. Doublet 22 includes a double concave lens element IX and a double convex lens element X, together forming a concave-convex doublet.

In telescope 8, lens 24 is a double convex lens, also designated XI. Lens 26 is a double concave lens, also designated XII.

In eyepiece 10, lens 28 is a double convex lens, also designated XIII. Doublet 30 includes a double convex lens element XIV and a concave-plano lens element XV, together forming a convex-plano doublet.

Telescope 8 and eyepiece 10 together form an afocal system used to view at infinity the image whose angular subtense is progressively varied by the cooperation of the objective 4 and the zoom system 6.

In the optical system as shown, axial spacings between lenses are designated S1 . . . S10. S5, S6, and S7 are variable due to the presence of the zoom system 6. S9 designates the fixed sum of three parts along the optical axis 36 between lens 26 and lens 28. In addition to the variability of spaces S5, S6, and S7, the objective 4 and the zoom system 6 may be moved in unison, thus varying S7 alone, to provide for viewing objects disposed on other than the object plane 38. S1 is the space between coverglass surface 40 and lens 12.

The parameters of the lens elements which make up this optical system are listed in the following table in which ND is the Refractive Index for the D line of sodium and $\nu$ is the Abbé number. Radii (R), thicknesses (T), and spacings (S) are expressed in millimeters and a negative sign indicates radii on centers of curvature lying on the object side of their vertices.

[Magnification=90×–550×   N.A.=0.16–0.55]

| Lens | Radius, R | Thickness, T | Space, S | Refractive Index, ND | Abbé Number, $\nu$ |
|---|---|---|---|---|---|
| | | | S1=0.2691$f$ | | |
| I | R1=−1.1473$f$ | T1=0.6103$f$ | | ND1=1.57241 | $\nu$1=57.59 |
| | R2=−0.6652$f$ | | S2=0.03552$f$ | | |
| II | R3=−5.3552$f$ | T2=0.2902$f$ | | ND2=1.51700 | $\nu$2=64.54 |
| | R4=−1.07696$f$ | | S3=0.28557$f$ | | |
| III | R5=15.43595$f$ | T3=0.16146$f$ | | ND3=1.80491 | $\nu$3=25.42 |
| IV | R6=1.51721$f$ | T4=0.36717$f$ | | ND4=1.48743 | $\nu$4=70.44 |
| | R7=−2.3983$f$ | | S4=0.03380$f$ | | |
| V | R8=4.2036$f$ | T5=0.16146$f$ | | ND5=1.80491 | $\nu$5=25.42 |
| VI | R9=1.7291$f$ | T6=0.48439$f$ | | ND6=1.56432 | $\nu$6=43.75 |
| | R10=−2.64187$f$ | | (90×)S5=0.758$f$ (200×)S5=3.029$f$ (300×)S5=3.649$f$ (550×)S5=4.212$f$ | | |
| | R11=−2.37266$f$ | | | | |

TABLE—Continued

| Lens | Radius, R | Thickness, T | Space, S | Refractive Index, ND | Abbé Number ν |
|---|---|---|---|---|---|
| VII | R12=0.810548f | T7=0.10764f | | ND7=1.61333 | ν7=57.37 |
| VIII | R13=1.63186f | T8=0.15608f | (90×)S6=4.138f (200×)S6=3.211f (300×)S6=2.369f (550×)S6=0.261f | ND8=1.73977 | ν8=28.19 |
| IX | R14=−7.78256f R15=5.12702f | T9=0.17008f | | ND9=1.78446 | ν9=25.75 |
| X | R16=−2.20527f | T10=0.31561f | (90×)S7=4.238f (200×)S7=2.893f (300×)S7=3.117f (550×)S7=4.661f | ND10=1.58904 | ν10=61.23 |
| XI | R17=3.2293f R18=−25.9849f | T11=0.2691f | S8=1.0791f | ND11=1.59538 | ν11=39.17 |
| XII | R19=−3.58105f R20=10.7815f | T12=0.19376f | S9=18.7454f | ND12=1.58904 | ν12=61.23 |
| XIII | R21=5.12702f R22=−5.12702f | T13=0.40151f | S10=1.1263f | ND13=1.51700 | ν13=64.54 |
| XIV | R23=1.6759f R24=−2.76846f | T14=0.50118f | | ND14=1.51700 | ν14=64.54 |
| XV | R25=Plano | T15=0.17223f | | ND15=1.78600 | ν15=25.25 |

The foregoing parameters of radius, (R), thickness (T), and spacing (S), are functions of the equivalent focal length F of the objective. The value of F, as an example, is 9.290 millimeters. At this focal length, the absolute values of the foregoing data are as follows:

[F=9.290, Magnification=90×–550×   N.A.=0.16–0.55]

| Lens | Radius, R | Thickness, T | Space, S | Refractive Index, ND | Abbé Number ν |
|---|---|---|---|---|---|
| I | R1=−10.6583 R2=−6.180 | T1=5.670 | S1=2.500 S2=0.330 | ND1=1.57241 | ν1=57.59 |
| II | R3=−49.750 R4=−10.005 | T2=2.696 | S3=2.653 | ND2=1.51700 | ν2=64.54 |
| III | R5=143.400 R6=14.0949 | T3=1.500 | | ND3=1.80491 | ν3=25.42 |
| IV | R7=−22.280 | T4=3.411 | S4=0.314 | ND4=1.48743 | ν4=70.44 |
| V | R8=39.051 R9=16.063 | T5=1.500 | | ND5=1.80491 | ν5=25.42 |
| VI | R10=−24.543 | T6=4.500 | (90×)S5=7.0415 (200×)S5=28.1440 (300×)S5=33.8992 (550×)S5=39.1327 | ND6=1.56432 | ν6=43.75 |
| VII | R11=−22.042 R12=7.530 | T7=1.000 | | ND7=1.61333 | ν7=57.37 |
| VIII | R13=15.160 | T8=1.450 | (90×)S6=38.4462 (200×)S6=29.8347 (300×)S6=22.0061 (550×)S6=2.4250 | ND8=1.73977 | ν8=28.19 |
| IX | R14=−72.300 R15=47.630 | T9=1.580 | | ND9=1.78446 | ν9=25.75 |
| X | R16=−20.487 | T10=2.932 | (90×)S7=39.3715 (200×)S7=26.8805 (300×)S7=28.9539 (550×)S7=43.3016 | ND10=1.58904 | ν10=61.23 |
| XI | R17=30.000 R18=−241.400 | T11=2.500 | S8=10.025 | ND11=1.59538 | ν11=39.17 |
| XII | R19=−33.268 R20=100.160 | T12=1.800 | S9=174.145 | ND12=1.58904 | ν12=61.23 |
| XIII | R21=47.630 R22=−47.630 | T13=3.730 | S10=10.463 | ND13=1.51700 | ν13=64.54 |
| XIV | R23=15.569 R24=−25.719 | T14=4.656 | | ND14=1.51700 | ν14=64.54 |
| XV | R25=Plano | T15=1.600 | | ND15=1.78600 | ν15=25.52 |

In this zoom system, the motion of lens 20 along the optical axis changes the magnification while the motion of lens 22 operates to hold the final image fixed in space. The motion of these components is accomplished by mechanism such as cams or linkages not essential to this invention. However, the ability of the system to hold the final image fixed in space is dependent both on the precision of the mechanism and of the lenses. Variations in either mechanism or lenses contribute in approximately the same order of magnitude to the inability of a zoom lens system to hold a final image fixed. As for the lenses, it is the variation of the magnification changer (i.e. lens 20) which causes the position of the final image to vary.

Referring now to FIG. 2, an alternative magnification changer is shown which can be used in place of lens 20. This lens pair will be designated 200 with its parameters labeled similarly to those of lens 20 except for the addition of a 0 in each case. Lens pair 200 includes a double concave lens, also designated XVI and a convex-concave lens, also designated XVII. By substituting lens pair 200 with its adjustable space S55, the effective focal length of the magnification changer 200 can be maintained in spite of manufacturing tolerances on the individual elements.

The parameters of the lenses which make up this alternative magnification changer are given in the following charts, first in terms of F, the equivalent focal length of the objective, and then in absolute values.

said optical system providing variable magnification of from substantially 90× to substantially 550×, said system comprising the following components in optical alignment:

a front concave-convex lens I;
a second concave-convex lens II;
a third convex-concave lens element III;
a fourth double convex lens element IV;
said third and fourth elements forming a doublet;
a fifth convex-concave lens element V;
a sixth double convex lens element VI;
said fifth and sixth elements forming a doublet;
a seventh double concave lens element VII;
an eighth convex-concave lens element VIII;
said seventh and eighth elements forming a doublet;
a ninth double concave lens element IX;
a tenth double convex lens element X;
said ninth and tenth elements forming a doublet;
an eleventh double convex lens XI;
a twelfth double concave lens XII;
a thirteenth double convex lens XIII;
a fourteenth double convex lens element XIV;
a fifteenth concave-plano lens element XV;
said fourteenth and fifteenth elements forming a doublet;

[Magnification = 90×–550×; N.A. = 0.16–0.55]

| Lens | Radius, R | Thickness, T | Space, S | Refractive Index, ND | Abbé Number $\nu$ |
|---|---|---|---|---|---|
|  |  |  | (90×)S5=0.87086f (200×)S5=3.1121f (300×)S5=3.7233f (550×)S5=4.2792f |  |  |
| XVI | R110=−2.7968f R120=0.7772f | T70=0.1076f |  | ND7=1.61333 | $\nu$7=57.37 |
|  |  |  | S55=0.535f |  |  |
| XVII | R125=0.8226f R130=1.5456f | T80=0.1561f |  | ND8=1.73977 | $\nu$8=28.19 |
|  |  |  | (90×)S6=4.0887f (200×)S6=3.1741f (300×)S6=2.3427f (550×)S6=0.2631f |  |  |

[F = 9.290, Magnification = 90×–550×   N.A. = 0.16–0.55]

| Lens | Radius, R | Thickness, T | Space, S | Refractive Index, ND | Abbé Number $\nu$ |
|---|---|---|---|---|---|
|  |  |  | (90×)S5=8.0903 (200×)S5=28.9114 (300×)S5=34.5898 (550×)S5=39.7534 |  |  |
| XVI | R110=−25.982 R120=7.220 | T70=1.000 |  | ND7=1.61333 | $\nu$7=57.37 |
|  |  |  | S55=0.497 |  |  |
| XVII | R125=7.642 R130=14.359 | T80=1.450 |  | ND8=1.73977 | $\nu$8=28.19 |
|  |  |  | (90×)S6=37.9841 (200×)S6=29.4877 (300×)S6=21.7637 (550×)S6=2.4443 |  |  |

What is claimed is:

1. A zoom type optical system for a microscope providing an image which is well corrected for chromatic and spherical aberrations, coma, astigmatism, and curvature of image field throughout the zoom range, the parameters of lens radii(R), thicknesses(T), spacings(S), refractive indices(ND), and Abbé numbers ($\nu$), being determined by the following relationship wherein radii, thicknesses and spacings are expressed in millimeters:

[Magnification=90×–550×   N.A.=0.16–0.55]

| Lens | Radius, R | Thickness, T | Space, S | Refractive Index, ND | Abbé Number, ν |
|---|---|---|---|---|---|
| I | R1=−1.1473f | T1=0.6103f | S1=0.2691f | ND1=1.57241 | ν1=57.59 |
|  | R2=−0.6652f |  | S2=0.03552f |  |  |
| II | R3=−5.3552f | T2=0.2902f |  | ND2=1.51700 | ν2=64.54 |
|  | R4=−1.07696f |  | S3=0.28557f |  |  |
| III | R5=15.43595f | T3=0.16146f |  | ND=1.80491 | ν3=25.42 |
| IV | R6=1.51721f | T4=0.36717f |  | ND4=1.48743 | ν4=70.44 |
|  | R7=−2.3983f |  | S4=0.03380f |  |  |
| V | R8=4.2036f | T5=0.16146f |  | ND5=1.80491 | ν5=25.42 |
| VI | R9=1.7291f | T6=0.48439f |  | ND6=1.56432 | ν6=43.75 |
|  | R10=−2.64187f |  | (90×)S5=0.758f<br>(200×)S5=3.029f<br>(300×)S5=3.649f<br>(550×)S5=4.212f |  |  |
| VII | R11=−2.37266f | T7=0.10764f |  | ND7=1.61333 | ν7=57.37 |
| VIII | R12=0.810548f | T8=0.15608f |  | ND8=1.73977 | ν8=28.19 |
|  | R13=1.63186f |  | (90×)S6=4.138f<br>(200×)S6=3.211f<br>(300×)S6=2.369f<br>(550×)S6=0.261f |  |  |
| IX | R14=−7.78256f | T9=0.17008f |  | ND9=1.78446 | ν9=25.75 |
| X | R15=5.12702f | T10=0.31561f |  | ND10=1.58904 | ν10=61.23 |
|  | R16=−2.20527f |  | (90×)S7=4.238f<br>(200×)S7=2.893f<br>(300×)S7=3.117f<br>(550×)S7=4.661f |  |  |
| XI | R17=3.2293f | T11=0.2691f |  | ND11=1.59538 | ν11=39.17 |
|  | R18=−25.9849f |  | S8=1.0791f |  |  |
| XII | R19=−3.58105f | T12=0.19376f |  | ND12=1.58904 | ν12=61.23 |
|  | R20=10.7815f |  | S9=18.745f |  |  |
| XIII | R21=5.12702f | T13=0.40151f |  | ND13=1.51700 | ν13=64.54 |
|  | R22=−5.12702f |  | S10=1.1263f |  |  |
| XIV | R23=1.6759f | T14=0.50118f |  | ND14=1.51700 | ν14=64.54 |
| XV | R24=−2.76846f | T15=0.17223f |  | ND15=1.78600 | ν15=25.25 |
|  | R25=Plano |  |  |  |  |

2. A zoom type optical system for a microscope providing an image which is well corrected for chromatic and spherical aberrations, coma, astigmatism, and curvature of image field throughout the zoom range,
said optical system providing variable magnification of from substantially 90× to substantially 550×, said system comprising the following components in optical alignment:
a front concave-convex lens I;
a second concave-convex lens II;
a third convex-concave lens element III;
a fourth double convex lens element IV;
said third and fourth elements forming a doublet;
a fifth convex-concave lens element V;
a sixth double convex lens element VI;
said fifth and sixth elements forming a doublet;
a seventh double concave lens element VII;
an eighth convex-concave lens element VIII;
said seventh and eighth elements forming a doublet;
a ninth double concave lens element IX;
a tenth double convex lens element X;
said ninth and tenth elements forming a doublet;
an eleventh double convex lens XI;
a twelfth double concave lens XII;
a thirteenth double convex lens XIII;
a fourteenth double convex lens element XIV;
a fifteenth concave-plano lens element XV;
said fourteenth and fifteenth elements forming a doublet;
the parameters of lens radii(R), thicknesses(T), spacings(S), refractive indices(ND), and Abbé numbers (ν), being determined by the following relationship wherein radii, thicknesses and spacings are expressed in millimeters:

[F=9.290   Magnification=90×–550×   N.A.=0.16–0.55]

| Lens | Radius, R | Thickness, T | Space, S | Refractive Index, ND | Abbé Number, ν |
|---|---|---|---|---|---|
| I | R1=−10.6583<br>R2=−6.180 | T1=5,670 | S1=2.500<br><br>S2=0.330 | ND1=1.57241 | ν1=57.59 |
| II | R3=−49.750<br>R4=−10.005 | T2=2.696 | S3=2.653 | ND2=1.515700 | ν2=64.54 |
| III | R5=143.400<br>R6=14.0949 | T3=1.500 | | ND3=1.80491 | ν3=25.42 |
| IV | R7=−22.280 | T4=3.411 | S4=0.314 | ND4=1.48743 | ν4=70.44 |
| V | R8=39.051<br>R9=16.063 | T5=1.500 | | ND5=1.80491 | ν5=25.42 |
| VI | R10=−24.543 | T6=4.500 | (90×)S5=7.0415<br>(200×)S5=28.1440<br>(300×)S5=33.8992<br>(550×)S5=39.1327 | ND6=1.56432 | ν6=43.75 |
| VII | R11=−22.042<br>R12=7.530 | T7=1.000 | | ND7=1.61333 | ν7=57.37 |
| VIII | R13=15.160 | T8=1.450 | (90×)S6=38.4462<br>(200×)S6=29.8347<br>(300×)S6=22.0061<br>(550×)S6=2.4250 | ND8=1.73977 | ν8=28.19 |
| IX | R14=−72.300<br>R15=47.630 | T9=1.580 | | ND9=1.78446 | ν9=25.75 |
| X | R16=−20.487 | T10=2.932 | (90×)S7=39.3715<br>(200×)S7=26.8805<br>(300×)S7=28.9539<br>(550×)S7=43.3016 | ND10=1.58904 | ν10=61.23 |
| XI | R17=30.000<br>R18=−241.400 | T11=2.500 | S8=10.025 | ND11=1.59538 | ν11=39.17 |
| XII | R19=−33.268<br>R20=100.160 | T12=1.800 | S9=174.145 | ND12=1.58904 | ν12=61.23 |
| XIII | R21=47.630<br>R22=−47.630 | T13=3.730 | S10=10.463 | ND13=1.51700 | ν13=64.54 |
| XIV | R23=15.569<br>R24=−25.719 | T14=4.656 | | ND14=1.51700 | ν14=64.54 |
| XV | R25=Plano | T15=1.600 | | ND15=1.78600 | ν15=25.52 |

3. A zoom type optical system for a microscope providing an image which is well corrected for chromatic and spherical aberrations, coma, astigmatism, and curvature of image field throughout the zoom range,
said optical system providing variable magnification of said substantially 90× to substantially 550×,
said system comprising the following components in optical alignment:
 a front concave-convex lens I;
 a second concave-convex lens II;
 a third convex-concave lens element III;
 a fourth double convex lens element IV;
 said third and fourth elements forming a doublet;
 a fifth convex-concave lens element V;
 a sixth double convex lens element VI;
 said fifth and sixth elements forming a doublet;
 a seventh double concave lens XVI;
 an eighth convex-concave lens XVII;
 a ninth double concave lens element IX;
 a tenth double convex lens element X;
 said ninth and tenth elements forming a doublet;
 an eleventh double convex lens XI;
 a twelfth double concave lens XII;
 a thirteenth double convex lens XIII;
 a fourteenth double convex lens element XIV;
 a fifteenth concave-plano lens element XV;
 said fourteenth and fifteenth elements forming a doublet;
the parameters of lens radii(R), thicknesses(T), spacings(S), refractive indices(ND), and Abbé numbers (ν), being determined by the following relationship wherein radii, thicknesses and spacings are expressed in millimeters:

[Magnification=90×–550×   N.A.=0.16–0.55]

| Lens | Radius, R | Thickness, T | Space, S | Refractive Index, ND | Abbé Number, ν |
|---|---|---|---|---|---|
| I | R1=−1.1473f<br>R2=−0.6652f | T1=0.6103f | S1=0.2691f<br><br>S2=0.03552f | ND1=1.57241 | ν1=57.59 |
| II | R3=−5.3552f<br>R4=−1.07696f | T2=0.2902f | S3=0.28557f | ND2=1.51700 | ν2=64.54 |
| III | R5=15.43595f<br>R6=1.51721f | T3=0.16146f | | ND3=1.80491 | ν3=25.42 |

TABLE—Continued

| Lens | Radius, R | Thickness, T | Space, S | Refractive Index, ND | Abbé Number ν |
|------|-----------|--------------|----------|---------------------|---------------|
| IV | R7=−2.3983f | T4=0.36717f | | ND4=1.48743 | ν4=70.44 |
|  | R8=4.2036f | | S4=0.03380f | | |
| V | R9=1.7291f | T5=0.16146f | | ND5=1.80491 | ν5=25.42 |
| VI | R10=−2.64187f | T6=0.48439f | | ND6=1.56432 | ν6=43.75 |
|  |  |  | (90×)S5=0.87086f (200×)S5=3.1121f (300×)S5=3.7233f (550×)S5=4.2792f | | |
| XVI | R110=−2.7968f | T70=0.1076f | | ND7=1.61333 | ν7=57.37 |
|  | R120=0.7772f | | S55=0.0535f | | |
| XVII | R125=0.8226f | T80=0.1561f | | ND8=1.73977 | ν8=28.19 |
|  | R130=1.5456f | | (90×)S6=4.0887f (200×)S6=3.1741f (300×)S6=2.3427f (550×)S6=0.2631f | | |
| IX | R14=−7.78256f | T9=0.17008f | | ND9=1.78446 | ν9=25.75 |
| X | R15=5.12702f | T10=0.31561f | | ND10=1.58904 | ν10=61.23 |
|  | R16=−2.20527f | | (90×)S7=4.238f (200×)S7=2.893f (300×)S7=3.117f (550×)S7=4.661f | | |
| XI | R17=3.2293f | T11=0.2691f | | ND11=1.59538 | ν11=39.17 |
|  | R18=−25.9849f | | S8=1.0791f | | |
| XII | R19=−3.58105f | T12=0.19376f | | ND12=1.58904 | ν12=61.23 |
|  | R20=10.7815f | | S9=18.745f | | |
| XIII | R21=5.12702f | T13=0.40151f | | ND13=1.51700 | ν13=64.54 |
|  | R22=−5.12702f | | S10=1.1263f | | |
| XIV | R23=1.6759f | T14=0.50118f | | ND14=1.51700 | ν14=64.54 |
| XV | R24=−2.76846f | T15=0.17223f | | ND15=1.78600 | ν15=25.25 |
|  | R25=Plano | | | | |

4. A zoom type optical system for a microscope providing an image which is well corrected for chromatic and spherical aberrations, coma, astigmatism, and curvature of image field throughout the zoom range,
said optical system providing variable magnification of from substantially 90× to substantially 550×,
said system comprising the following components in optical alignment:
a front concave-convex lens I;
a second concave-convex lens II;
a third convex-concave lens element III;
a fourth double convex lens element IV;
said third and fourth elements forming a doublet;
a fifth convex-concave lens element V;
a sixth double convex lens element VI;
said fifth and sixth elements forming a doublet;
a seventh double concave lens XVI;
an eighth convex-concave lens XVII;
a ninth double concave lens element IX;
a tenth double convex lens elements X;
said ninth and tenth elements forming a doublet;
an eleventh double convex lens XI;
a twelfth double concave lens XII;
a thirteenth double convex lens XIII;
a fourteenth double convex lens element XIV;
a fifteenth concave-plano lens element XV;
said fourteenth and fifteenth elements forming a doublet;
the parameters of lens radii(R), thicknesses(T), spacings(S), refractive indices(ND), and Abbé numbers (ν), being determined by the following relationship wherein radii, thicknesses and spacings are expressed in millimeters:

[F=9.290     Magnification=90×–550×     N.A.=0.16–0.55]

| Lens | Radius, R | Thickness, T | Space, S | Refractive Index, ND | Abbé Number ν |
|------|-----------|--------------|----------|---------------------|---------------|
|  |  |  | S1=2.500 | | |
| I | R1=−10.6583 | T1=5.670 | | ND1=1.57241 | ν1=57.59 |
|  | R2=−6.180 | | S2=0.330 | | |
| II | R3=−49.750 | T2=2.696 | | ND2=1.51700 | ν2=64.54 |
|  | R4=−10.005 | | S3=2.653 | | |
| III | R5=143.400 | T3=1.500 | | ND3=1.80491 | ν3=25.42 |
| IV | R6=14.0949 | T4=3.411 | | ND4=1.48743 | ν4=70.44 |
|  | R7=−22.280 | | S4=0.314 | | |
| V | R8=39.051 | T5=1.500 | | ND5=1.80491 | ν5=25.42 |
|  | R9=16.063 | | | | |

TABLE—Continued

| Lens | Radius, R | Thickness, T | Space, S | Refractive Index, ND | Abbé Number $\nu$ |
|---|---|---|---|---|---|
| VI | R10=−24.543 | T6=4.500 | | ND6=1.56432 | $\nu 6$=43.75 |
| | | | (90×)S5=8.0903<br>(200×)S5=28.9114<br>(300×)S5=34.5898<br>(550×)S5=39.7534 | | |
| XVI | R110=−25.982<br>R120=7.220 | T70=1.000 | | ND7=1.61333 | $\nu 7$=57.37 |
| | | | S55=0.497 | | |
| XVII | R125=7.642<br>R130=14.359 | T80=1.450 | | ND8=1.73977 | $\nu 8$=28.19 |
| | | | (90×)S6=37.9841<br>(200×)S6=29.4877<br>(300×)S6=21.7637<br>(550×)S6=2.4443 | | |
| IX | R14=−72.300<br>R15=47.630 | T9=1.580 | | ND9=1.78446 | $\nu 9$=25.75 |
| X | R16=−20.487 | T10=2.932 | | ND10=1.58904 | $\nu 10$=61.23 |
| | | | (90×)S7=39.3715<br>(200×)S7=26.8805<br>(300×)S7=28.9539<br>(550×)S7=43.3016 | | |
| XI | R17=30.000<br>R18=−241.400 | T11−2.500 | | ND11=1.59538 | $\nu 11$=39.17 |
| | | | S8=10.025 | | |
| XII | R19=−33.268<br>R20=100.160 | T12=1.800 | | ND12=1.58904 | $\nu 12$=61.23 |
| | | | S9=174.145 | | |
| XIII | R21=47.630<br>R22=−47.630 | T13=3.730 | | ND13=1.51700 | $\nu 13$=64.54 |
| | | | S10=10.463 | | |
| XIV | R23=15.569<br>R24=−25.719 | T14=4.656 | | ND14=1.51700 | $\nu 14$=64.54 |
| XV | R25=Plano | T15=1.600 | | ND15=1.78600 | $\nu 15$=25.52 |

References Cited

UNITED STATES PATENTS 3,456,998   7/1969   Rosenberger et al. __ 350—184 X

DAVID SCHONBERG, Primary Examiner

P. A. SACHER, Assistant Examiner

U.S. Cl. X.R.

350—38, 175 ML, 176, 184